(12) United States Patent
Kim

(10) Patent No.: US 7,392,738 B2
(45) Date of Patent: *Jul. 1, 2008

(54) LOCKING DEVICE FOR SILICONE PACKINGS OF HOUSEHOLD BEAN MILK AND BEAN CURD MAKERS

(76) Inventor: Hong-bae Kim, 5-7, Hyunchen-dong, Dukyang-ku, Koyang-city, Kyunggi-do (KR)

( * ) Notice: Subject to any disclaimer, the term of this patent is extended or adjusted under 35 U.S.C. 154(b) by 575 days.

This patent is subject to a terminal disclaimer.

(21) Appl. No.: 10/897,421

(22) Filed: Jul. 23, 2004

(65) Prior Publication Data

US 2005/0076792 A1    Apr. 14, 2005

(30) Foreign Application Priority Data

Oct. 14, 2003    (KR)    ........................ 20-2003-0032245

(51) Int. Cl.
*A23L 1/00*    (2006.01)
*A23L 1/20*    (2006.01)

(52) U.S. Cl. ........................... 99/348; 99/288; 99/483; 277/598

(58) Field of Classification Search ................ 99/348, 99/281, 285, 286, 288, 331, 323.3, 341, 510, 99/483, 495; 277/598
See application file for complete search history.

(56) References Cited

U.S. PATENT DOCUMENTS

| | | | |
|---|---|---|---|
| 360,485 A | 4/1887 | Smith | |
| 2,980,099 A | 4/1961 | Klemm | |
| 4,059,016 A | 11/1977 | Kitzinger et al. | |
| 4,101,138 A * | 7/1978 | Gaggiano | 277/598 |
| 4,203,099 A | 5/1980 | Edwards | |
| 4,205,237 A | 5/1980 | Miller | |
| 4,784,396 A * | 11/1988 | Scott et al. | 277/598 |
| 4,828,396 A * | 5/1989 | Singer et al. | 366/149 |
| 5,013,158 A | 5/1991 | Tarlow | |
| 5,201,263 A | 4/1993 | Teng | |
| 5,446,444 A | 8/1995 | Lease | |
| 5,487,359 A | 1/1996 | Montreuil | |
| 5,516,208 A | 5/1996 | Givant | |
| 5,547,279 A * | 8/1996 | Spitzer Sr. | 366/251 |
| 5,600,997 A | 2/1997 | Kemp et al. | |
| 5,699,239 A | 12/1997 | Komori | |
| 5,761,912 A * | 6/1998 | Popp et al. | 62/51.1 |
| 5,852,965 A | 12/1998 | Kim | |
| 5,936,356 A | 8/1999 | Brault | |
| 5,980,099 A | 11/1999 | Soon | |
| 6,232,883 B1 | 5/2001 | Silva et al. | |

(Continued)

*Primary Examiner*—Reginald L Alexander
(74) *Attorney, Agent, or Firm*—Shlesinger, Arkwright & Garvey LLP

(57) ABSTRACT

Locking device for silicone packings of household bean milk and bean curd makers, that firmly attaches a silicone packing in a predetermined position in a bean milk and bean curd maker, thus preventing the silicone packing from being undesirably dislodged from its predetermined position in the maker. Loss of the silicone packing is thus prevented. The silicone packing is attached to an underside of the main body so as to prevent leakage of water into the main body and to absorb shock. The locking device for the silicone packing includes protrusions on an upper surface of the silicone packing, and locking depressions on a lower portion of the main body corresponding to the protrusions, so that the protrusions are inserted into and engages with the corresponding locking depressions, in use.

6 Claims, 4 Drawing Sheets

U.S. PATENT DOCUMENTS

| | | |
|---|---|---|
| 6,247,393 B1 | 6/2001 | Chang |
| 6,248,978 B1 | 6/2001 | Okuda |
| 6,345,572 B1 | 2/2002 | Kao |
| 6,371,489 B1 * | 4/2002 | Combet et al. .............. 277/594 |
| 6,653,941 B2 | 11/2003 | Kim |
| 6,688,214 B1 | 2/2004 | Kikuchi et al. |
| 6,703,723 B2 | 3/2004 | Kim |
| 6,792,849 B1 | 9/2004 | Kim |
| 6,796,220 B2 | 9/2004 | Lee |
| 6,860,193 B1 | 3/2005 | Kim |

* cited by examiner

LOCKING DEVICE FOR SILICONE PACKINGS OF HOUSEHOLD BEAN MILK AND BEAN CURD MAKERS

CROSS-REFERENCE TO RELATED APPLICATIONS

This application claims the priority of Korean application no. 2003-0032245, filed Oct. 14, 2003, which is incorporated herein by reference.

This application relates to Applicant's concurrently filed application Ser. No. (10/897419), filed Jul. 23, 2004.

This application likewise relates to application Ser. No. 10/131,460, filed Apr. 25, 2002, now U.S. Pat. No. 6,653,941, issued Nov. 25, 2003.

This application further relates to application Ser. No. 10/131,192, filed Apr. 25, 2002, now U.S. Pat. No. 6,703,723, issued Mar. 9, 2004.

FIELD OF THE INVENTION

The present invention relates generally to household bean milk and bean curd makers, and more particularly, to a household bean milk and bean curd maker, which is constructed so that a silicone packing is firmly attached to a predetermined position in the maker, thus preventing the silicone packing from being undesirably removed from its predetermined position in the maker, therefore preventing loss of the silicone packing, and allowing convenient use.

BACKGROUND OF THE INVENTION

A conventional method of making bean milk and bean curd has a problem in that several processes are individually executed, thus it is inconvenient and complicated to make bean milk and bean curd, and it takes longer time to make the bean milk and the bean curd, thereby the conventional method is inefficient.

In order to solve these problems, there have been proposed various devices for easily and conveniently making bean milk and bean curd at home. For example, there are Korean Patent No. 225772, Korean Patent No. 228659, Korean U.M. Registration No. 158856, Korean U.M. Registration No. 250843, etc, that are disclosed by the applicant of the present invention. The Korean Patent No. 225772 was published on Oct. 15, 1999, and is titled "household bean curd maker". The Korean Patent No. 2000-228659 was published on Mar. 15, 2000, and is titled "household bean curd maker". The Korean U.M. Registration No. 158856 was registered on Jul. 16, 1999, and is titled "household bean curd makers". The Korean U.M. Registration No. 250843 was registered on Oct. 5, 2001, and is titled "household bean curd maker with fixed-type blade unit".

A conventional household bean milk and bean curd maker will be described in the following with reference to the attached drawing.

FIG. 1 is a sectional view of the conventional household bean milk and bean curd maker. As shown in FIG. 1, the conventional household bean milk and bean curd maker includes a housing 1 which has a cavity to contain water therein. A main body 2 is provided on an upper portion of the housing 1 to open or close the housing 1, like a lid. A drive motor 3 is installed in a predetermined portion of the main body 2, and generates rotating power when electricity is applied to the drive motor 3. A drive shaft 4 transmits the rotating power from the drive motor 3. A cutting blade 5 is provided at an end of the drive shaft 4. A rod-shaped heater 6 downwardly extends from the main body 2, and generates heat when electricity is applied to the heater 6, thus heating an interior of the housing 1. A temperature sensing bar 7 detects the temperature of the interior of the housing 1. A filter net 8 is detachably mounted to a predetermined portion of the main body 2, and contains beans therein. Further, the household bean milk and bean curd maker also includes silicone packing 9 which is attached to an underside of the main body 2 at a junction between the main body 2 and the housing 1. The silicone packing 9 functions to prevent leakage of water into the main body 2 and absorb a shock.

The conventional household bean milk and bean curd maker constructed as described above is operated as follows.

First, a user puts water into the housing 1. Beans are put into the filter net 8 which is detached from the main body 2, and then the filter net 8 containing the beans is mounted to the lower portion of the main body 2. Afterwards, the main body 2 is placed on the upper portion of the housing 1 so that the filter net 8 is put into the housing 1.

Next, when a power switch (not shown) is turned on to apply electricity to the household bean milk and bean curd maker, a control unit (not shown) outputs a control signal to operate the heater 6 and the temperature sensing bar 7. At this time, a primary heating process is executed while maintaining a predetermined temperature, for a predetermined period.

When the primary heating process has been completed, the control unit (not shown) outputs a control signal to operate the drive motor 3. As the drive motor 3 is operated, the beans contained in the filter net 8 are ground by the cutting blade 5 provided at the end of the drive shaft 4. While the beans are ground, turbulence of water contained in the housing 1 is caused by rotation of the cutting blade 5. By the turbulence, bean grains which are finely ground by the cutting blade 5 come out of the filter net 8. Thus, the beans ground by the cutting blade 5 are divided into bean-curd dregs which remain in the filter net 8, and the extract of protein which flows out of the filter net 8.

Thereafter, the control unit (not shown) outputs a control signal to operate the heater 6 and the temperature sensing bar 7. At this time, a secondary heating process is executed while maintaining a predetermined temperature, for a predetermined period. Through the above-mentioned process, bean milk is obtained.

When the user desires to make bean curd, the user takes the heated extract of protein out of the housing 1. Next, a coagulant is added to the heated extract of protein so as to coagulate the extract of protein. Thereafter, the coagulated protein is pressed in a frame to produce the bean curd.

The silicone packing 9, attached to the underside of the main body 2, prevents water from entering the main body 2, and absorbs shock generated when the main body 2 is assembled with the housing 1 or the bean milk and bean curd maker is operated.

However, the conventional household bean milk and bean curd maker has a problem in that the attachment of the silicone packing 9, which is attached to the underside of the main body 2 so as to prevent the leakage of water into the main body 2 and absorb shock, is undesirably weak, so that the silicone packing 9 may be easily dislodged from its predetermined position in the maker when the maker is cleaned. Thereby, it is inconvenient to use, and loss of the silicone packing 9 may occur.

OBJECTS AND SUMMARY OF THE INVENTION

Accordingly, the present invention has been made keeping in mind the above problems occurring in the prior art, and an object of the present invention is to provide a locking device for silicone packings of household bean milk and bean curd makers, which firmly attaches a silicone packing to a predetermined position in a bean milk and bean curd maker, thus preventing the silicone packing from being undesirably dislodged from its predetermined position in the maker, therefore preventing loss of the silicone packing, and allowing convenient use.

The invention includes a locking device for silicone packings of household bean milk and bean curd makers, which firmly attaches a silicone packing to a predetermined position in a bean milk and bean curd maker, thus preventing the silicone packing from being undesirably dislodged from its predetermined position in the maker, therefore preventing loss of the silicone packing, and allowing convenient use. In the maker including a housing having a cavity therein, a main body provided on an upper portion of the housing to open or close the housing, like a lid, and the silicone packing attached to an underside of the main body so as to prevent leakage of water into the main body and absorb shock, the locking device for the silicone packing includes a plurality of protrusions provided on an upper surface of the silicone packing, and a plurality of locking depressions provided on a lower portion of the main body to correspond to the protrusions, so that the protrusions are inserted into the corresponding locking depressions.

DETAILED DESCRIPTION OF THE INVENTION

Hereinafter, the present invention will be described in detail with reference to the attached drawings. The above and other objects, features and other advantages of the present invention will be more clearly understood from the following detailed description taken in conjunction with the accompanying drawings.

Although the embodiments of the present invention have been disclosed for illustrative purposes, those skilled in the art will appreciate that various modifications, additions and substitutions are possible, without departing from the scope and spirit of the invention as disclosed in the accompanying claims.

A locking-device for silicone packings of household bean milk and bean curd makers, according to the first embodiment of the present invention, is constructed as follows.

Figure 1:
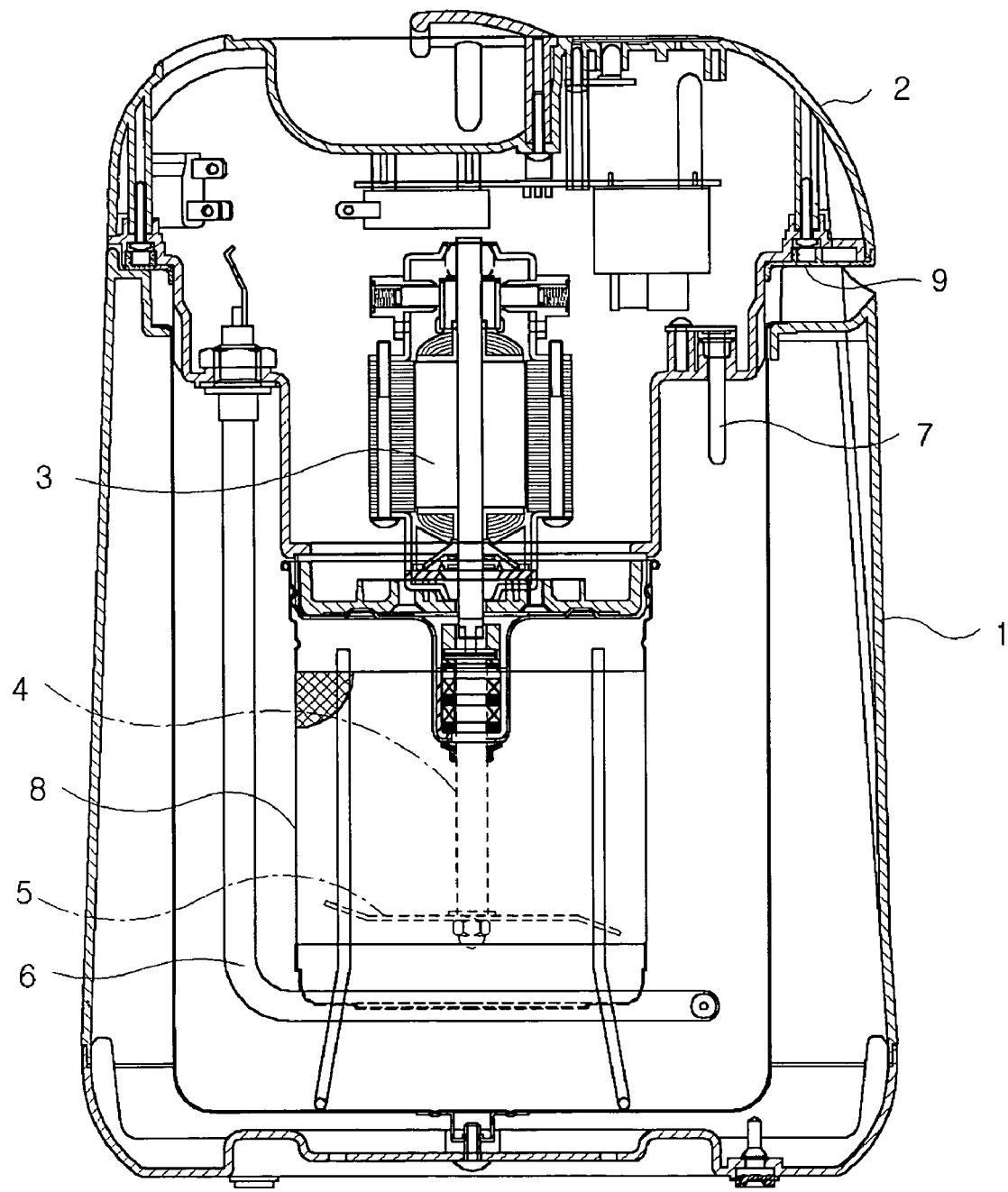
FIG. 1 is a sectional view of a conventional household bean milk and bean curd maker.
Figure 2:
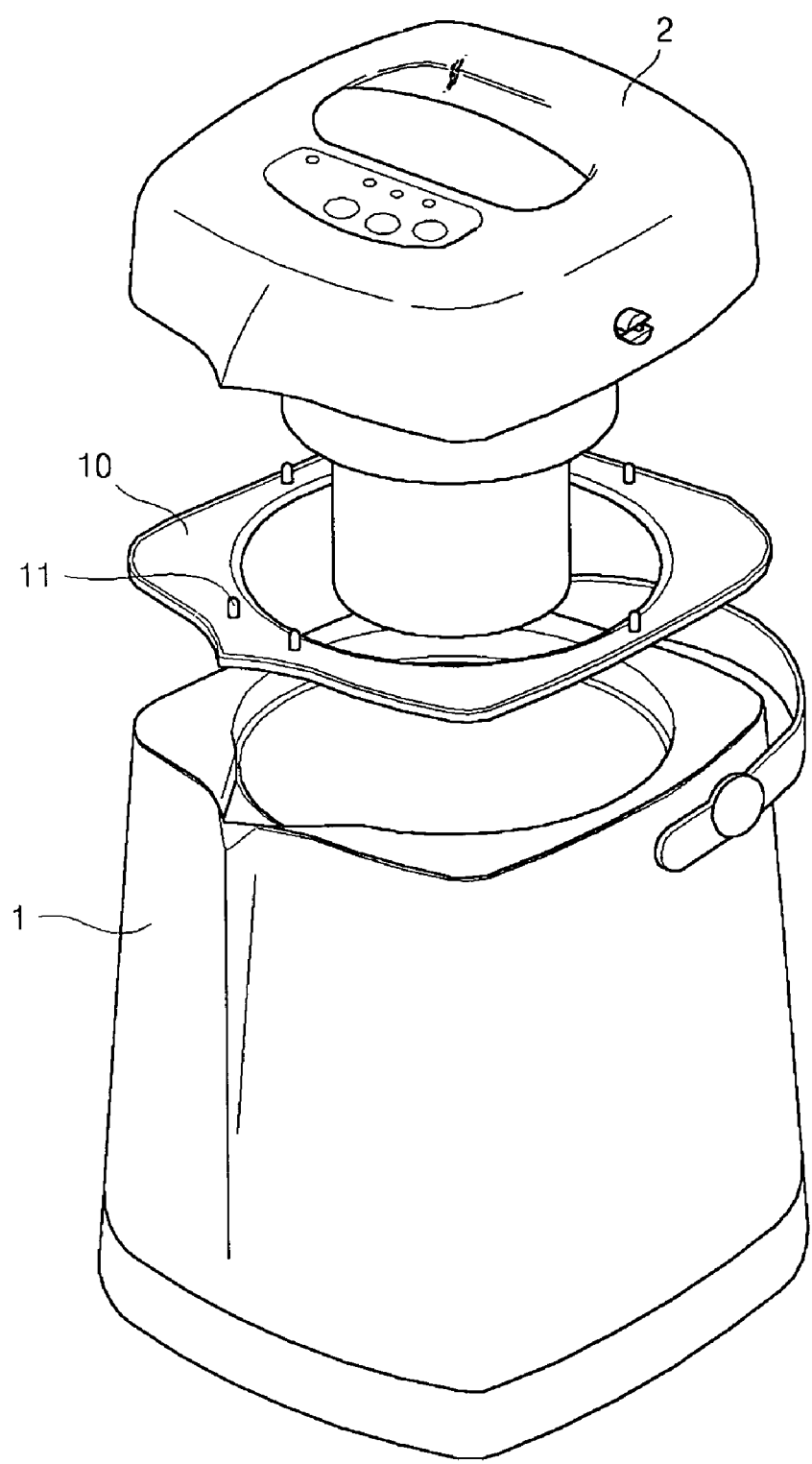
FIG. 2 is an exploded perspective view of a household bean milk and bean curd maker having a locking device for a silicone packing, according to a first embodiment of the present invention.
Figure 3:
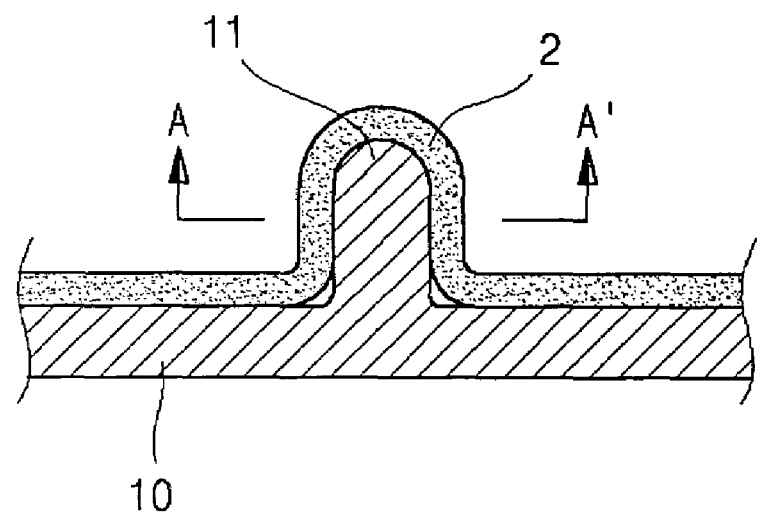
FIG. 3 is a sectional view of the locking device for the silicone packing of the household bean milk and bean curd maker of FIG. 2.
Figure 4:
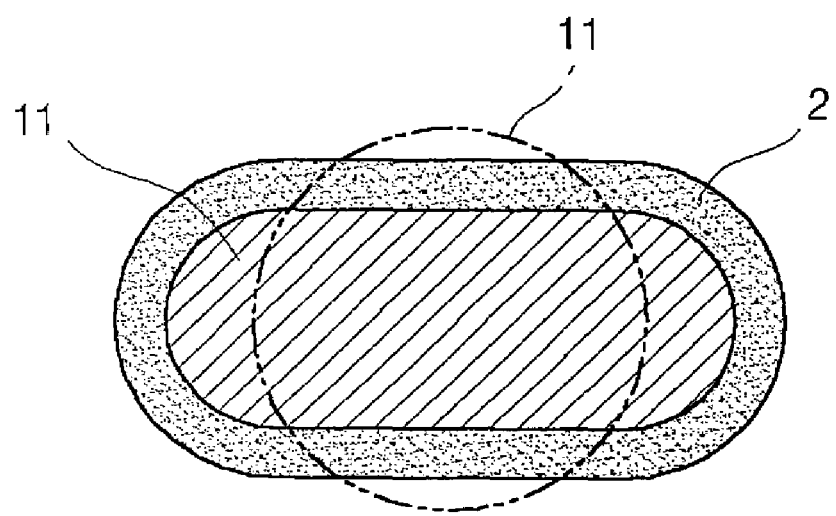
FIG. 4 is a sectional view taken along the line A-A' of FIG. 3.

As shown in FIGS. 2 through 4, a household bean milk and bean curd maker includes a housing 1, a main body 2, and a silicone packing 10. The housing 1 has a cavity therein. The main body 2 is provided on an upper portion of the housing 1 to open or close the housing 1, like a lid. The silicone packing 10 is attached to an underside of the main body 2 so as to prevent leakage of water in the main body 2 and absorb shock. In this case, the locking device includes a plurality of protrusions 11 and a plurality of locking depressions. The protrusions 11 are provided on an upper surface of the silicone packing 10. Further, the locking depressions are provided on a lower portion of the main body 2 to correspond to the protrusions 11, so that the protrusions 11 are inserted into the corresponding locking depressions. However, each locking depression has a cross-section different from that of each protrusion 11, thus allowing each protrusion 11 to be elastically deformed when each protrusion 11 is inserted into an associated locking depression.

The operation of the locking device for the silicone packings of the household bean milk and bean curd makers, according to the first embodiment of the present invention, is as follows.

After the silicone packing 10 is placed under the main body 2, the protrusions 11 of the silicone packing 10 are inserted into the corresponding locking depressions provided on the lower portion of the main body 2. Thus, the silicone packing 10 is secured to the underside of the main body 2.

In this case, each protrusion 11 of the silicone packing 10 has a circular cross-section as shown by the dotted line of FIG. 4, but each locking depression has an oblong cross-section. Thereby, as the protrusions 11 are inserted into the corresponding locking depressions, each protrusion 11 is deformed from a circular cross-section to an oblong cross-section, thus having an elastic restoring force. Therefore, the protrusions 11 are tightly secured into the oblong locking depressions, so that the coupling between the protrusions 11 and the locking depressions is strong.

According to this embodiment, each protrusion 11 has a circular cross-section, while each locking depression has an oblong cross-section. However, the protrusions 11 and the locking depressions may have cross-sections different from those of this embodiment, as long as the elastic restoring force is present when the protrusions 11 are inserted into the corresponding locking depressions. For example, each protrusion 11 may have a rectangular cross-section, and each locking recess may have a circular cross-section.

Figure 5:
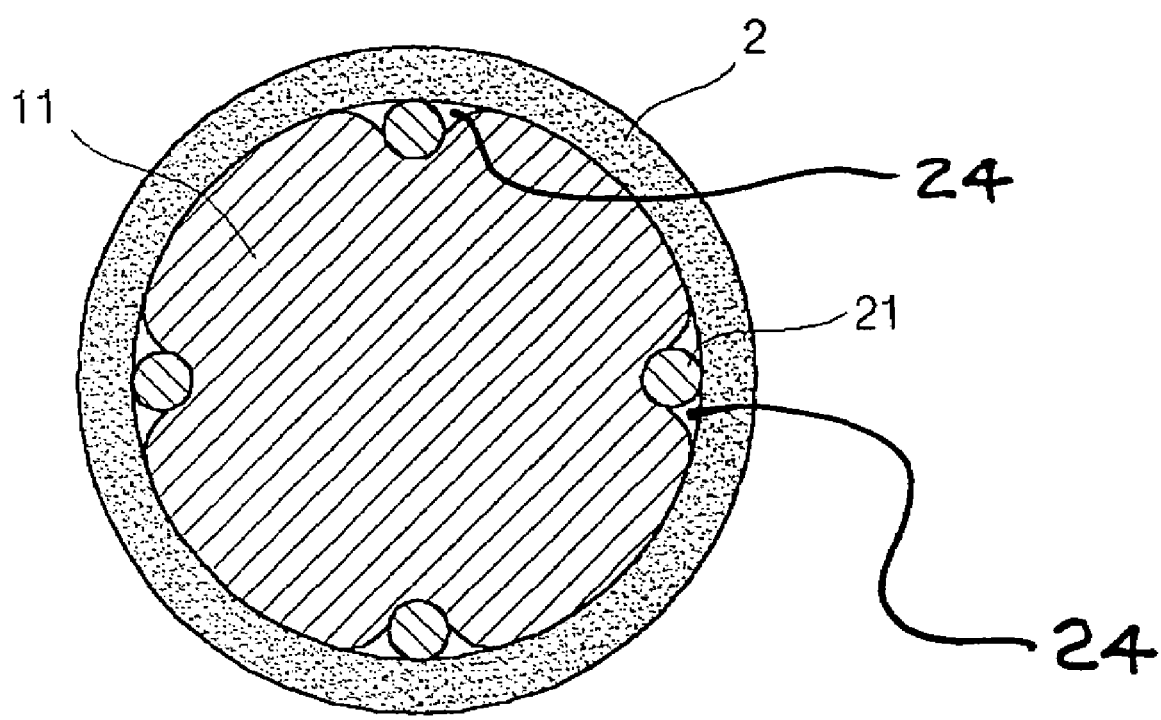
FIG. 5 is a sectional view of a locking device for a silicone packing of a household bean milk and bean curd maker, according to a second embodiment of the present invention.

Further, a locking device for silicone packings of household bean milk and bean curd makers, according to the second embodiment of the present invention, is constructed as shown in FIG. 5. The household bean milk and bean curd maker includes a housing 1, a main body 2, and a silicone packing 10. The housing 1 has a cavity therein. The main body 2 is provided on an upper portion of the housing 1 to open or close the housing 1, like a lid. The silicone packing 10 is attached to an underside of the main body 2 so as to prevent leakage of water into the main body 2 and absorb shock. In this case, the locking device includes a plurality of protrusions 11 which is provided on an upper surface of the silicone packing 10. A plurality of locking depressions is provided on a lower portion of the main body 2 to correspond to the protrusions 11, so that the protrusions 11 are inserted into the corresponding locking depressions. Further, according to the second embodiment, a plurality of bosses 21 is provided in each locking depression. Thus, when the protrusions 11 are inserted into the corresponding locking depressions, the protrusions 11 are elastically deformed by the bosses 21. Further, air holes 24 are provided to easily insert the protrusions 11 into the corresponding locking depressions.

The operation of the locking device for the silicone packings of the household bean milk and bean curd makers, according to the second embodiment of the present invention, is as follows.

After the silicone packing 10 is placed under the main body 2, the protrusions 11 of the silicone packing 10 are inserted into the corresponding circular locking depressions provided on the lower portion of the main body 2. Thus, the silicone packing 10 is secured to the underside of the main body 2.

In this case, each protrusion 11 of the silicone packing 10 has a circular cross-section. However, when the protrusions 11 are inserted into the corresponding locking depressions, each protrusion 11 is deformed by the bosses 21 provided in each locking depression, thus having an elastic restoring force. Thereby, the protrusions 11 are tightly inserted into the corresponding locking depressions, so that a coupling between the silicone packing 10 and the main body 2 is strong.

Further, as the protrusions 11 are inserted into the corresponding locking depressions, spaces 24 are defined between the bosses 21 and the deformed protrusions 11. Thereby, air is easily discharged to the outside of the locking depressions, thus allowing the protrusions 11 to be easily inserted into the corresponding locking depressions.

As described above, the present invention provides a locking device for silicone packings of household bean milk and bean curd makers, which firmly attaches a silicone packing to a predetermined position in a bean milk and bean curd maker, thus preventing the silicone packing from being undesirably dislodged from its predetermined position of the maker, therefore preventing loss of the silicone packing, and allowing convenient use.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A locking device for silicone packings of household bean milk and bean curd makers, the makers individually having a housing with a cavity, a main body provided on an upper portion of the housing for opening and closing the housing, and a silicone packing attached to an underside of the main body so as to prevent leakage of water into the main body and to absorb shock, in use, the locking device, comprising:
   a) a plurality of protrusions provided on an upper surface of the silicone packing;
   b) a plurality of locking depressions provided on a lower portion of the main body and corresponding to the protrusions, so that the protrusions are inserted into the corresponding locking depressions, in use;
   c) each of the locking depressions having a cross-section different from that of each of the protrusions, thus allowing the protrusions to be deformed to have an elastic restoring force, when the protrusions are inserted into the corresponding locking depressions, in use;
   d) a boss provided in each of the locking depressions, thus causing the protrusions to be deformed to have an elastic restoring force when the protrusions are inserted into the corresponding locking depressions, in use; and
   e) an air hole provided to allow the protrusions to be easily inserted into the corresponding locking depressions.

2. A locking device for silicone packings of household bean milk and bean curd makers, the makers individually having a housing with a cavity, a main body provided on an upper portion of the housing for opening and closing the housing, and a silicone packing attached to an underside of the main body so as to prevent leakage of water into the main body and to absorb shock, in use, the locking device, comprising:
   a) a plurality of protrusions provided on an upper surface of the silicone packing;
   b) a plurality of locking depressions provided on a lower portion of the main body and corresponding to the protrusions, so that the protrusions are inserted into the corresponding locking depressions, in use;
   c) a boss provided in each of the locking depressions, thus causing the protrusions to be deformed to have an elastic restoring force when the protrusions are inserted into the corresponding locking depressions, in use; and
   d) an air hole provided to allow the protrusions to be easily inserted into the corresponding locking depressions.

3. A household bean milk and bean curd maker, comprising:
   a) a housing defining a cavity;
   b) a main body provided on an upper portion of the housing for opening and closing the housing;
   c) a locking device, including:
      i) a silicone packing attached to an underside of the main body so as to prevent leakage of water into the main body and to absorb shock, in use;
      ii) a plurality of protrusions provided on an upper surface of the silicone packing; and
      iii) a plurality of locking depressions provided on a lower portion of the main body and corresponding to the protrusions, so that the protrusions are inserted into and engage with the corresponding locking depressions, in use;
   d) each of the locking depressions having a cross-section sufficiently different from that of each of the protrusions, so that the protrusions are sufficiently deformed to exert an elastic restoring force, when the protrusions are inserted into the corresponding locking depressions, in use;
   e) a boss provided in each of the locking depressions, the boss being configured for causing the protrusions to be deformed to have an elastic restoring force when the protrusions are inserted into the corresponding locking depressions, in use; and
   f) an air hole provided to allow the protrusions to be easily inserted into the corresponding locking depressions.

4. A household bean milk and bean curd maker, comprising:
   a) a housing defining a cavity;
   b) a main body provided on an upper portion of the housing for opening and closing the housing;
   c) a locking device, including:
      i) a silicone packing attached to an underside of the main body so as to prevent leakage of water into the main body and to absorb shock, in use;
      ii) a plurality of protrusions provided on an upper surface of the silicone packing; and
      iii) a plurality of locking depressions provided on a lower portion of the main body and corresponding to the protrusions, so that the protrusions are inserted into and engage with the corresponding locking depressions, in use;

d) a boss provided in each of the locking depressions, the boss being configured for causing the protrusions to be deformed to have an elastic restoring force when the protrusions are inserted into the corresponding locking depressions, in use; and e) an air hole provided to allow the protrusions to be easily inserted into the corresponding locking depressions.

5. The household bean milk and bean curd maker according to claim 4, wherein:

a) the air hole is defined between the boss and the protrusion.

6. The household bean milk and bean curd maker according to claim 4, wherein:

a) each of the locking depressions has a cross-section sufficiently different from that of each of the protrusions, so that the protrusions are sufficiently deformed to exert an elastic restoring force, when the protrusions are inserted into the corresponding locking depressions, in use.

* * * * *